United States Patent
Kinane et al.

(10) Patent No.: US 6,257,309 B1
(45) Date of Patent: Jul. 10, 2001

(54) METHOD OF SPRAY FORMING READILY WELDABLE AND MACHINABLE METAL DEPOSITS

(75) Inventors: Jeffrey Alan Kinane, Birmingham; David Robert Collins, Southgate; Matthew John Zaluzec, Canton; Paul Earl Pergande, Beverly Hills, all of MI (US); Grigoriy Grinberg, Sylvania, OH (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/186,032

(22) Filed: Nov. 4, 1998

(51) Int. Cl.$^7$ ................................................ B22D 23/00
(52) U.S. Cl. ........................ 164/46; 427/449; 427/456
(58) Field of Search .............................. 164/46; 427/449, 427/451, 456

(56) References Cited

U.S. PATENT DOCUMENTS

| | | | |
|---|---|---|---|
| 3,631,745 | * | 1/1972 | Walkey et al. .................... 164/46 |
| 4,163,071 | * | 7/1979 | Weatherly et al. ............... 427/451 |
| 5,460,851 | | 10/1995 | Jenkins et al. . |
| 5,476,222 | | 12/1995 | Singer et al. . |
| 5,516,586 | | 5/1996 | Singer et al. . |
| 5,634,593 | | 6/1997 | Jenkins . |
| 5,635,096 | | 6/1997 | Singer et al. . |
| 5,658,506 | | 8/1997 | White et al. . |
| 5,718,863 | | 2/1998 | McHugh et al. . |
| 5,746,966 | | 5/1998 | McDonald . |
| 5,947,179 | | 9/1999 | Kinane et al. . |

FOREIGN PATENT DOCUMENTS

WO 96/09421    3/1996  (WO) .

OTHER PUBLICATIONS

Thermal Spraying: Practice, Theory, and Application, American Welding Society, p. 57 1985 (no month date).*
Hackh's Chemical Dictionary, Julius Grant, ed., McGraw–Hill Book Company, pp. 636–637, 1969 (no month date).*

* cited by examiner

*Primary Examiner*—Katherine A. Bareford
(74) *Attorney, Agent, or Firm*—Damian Porcari

(57) ABSTRACT

A method of spray forming a weldable metal deposit. The method comprises (a) providing a ceramic spray forming pattern, (b) heating the spray forming pattern to a sustained temperature sufficient to prevent internal stress formation in deposited carbon steel having a carbon content of less than about 0.3 weight percent when deposited on the heated spray forming pattern, (c) spraying metallic particles onto the spray forming pattern heated to the sustained temperature, and (d) allowing the sprayed metallic particles to cool to form a metal deposit. The metallic particles have a carbon content which is sufficient to result in metal particles having a carbon content of less than about 0.3 weight percent when deposited on the heated spray forming pattern. The resulting deposit has a carbon content of less than about 0.3 weight percent.

9 Claims, 2 Drawing Sheets

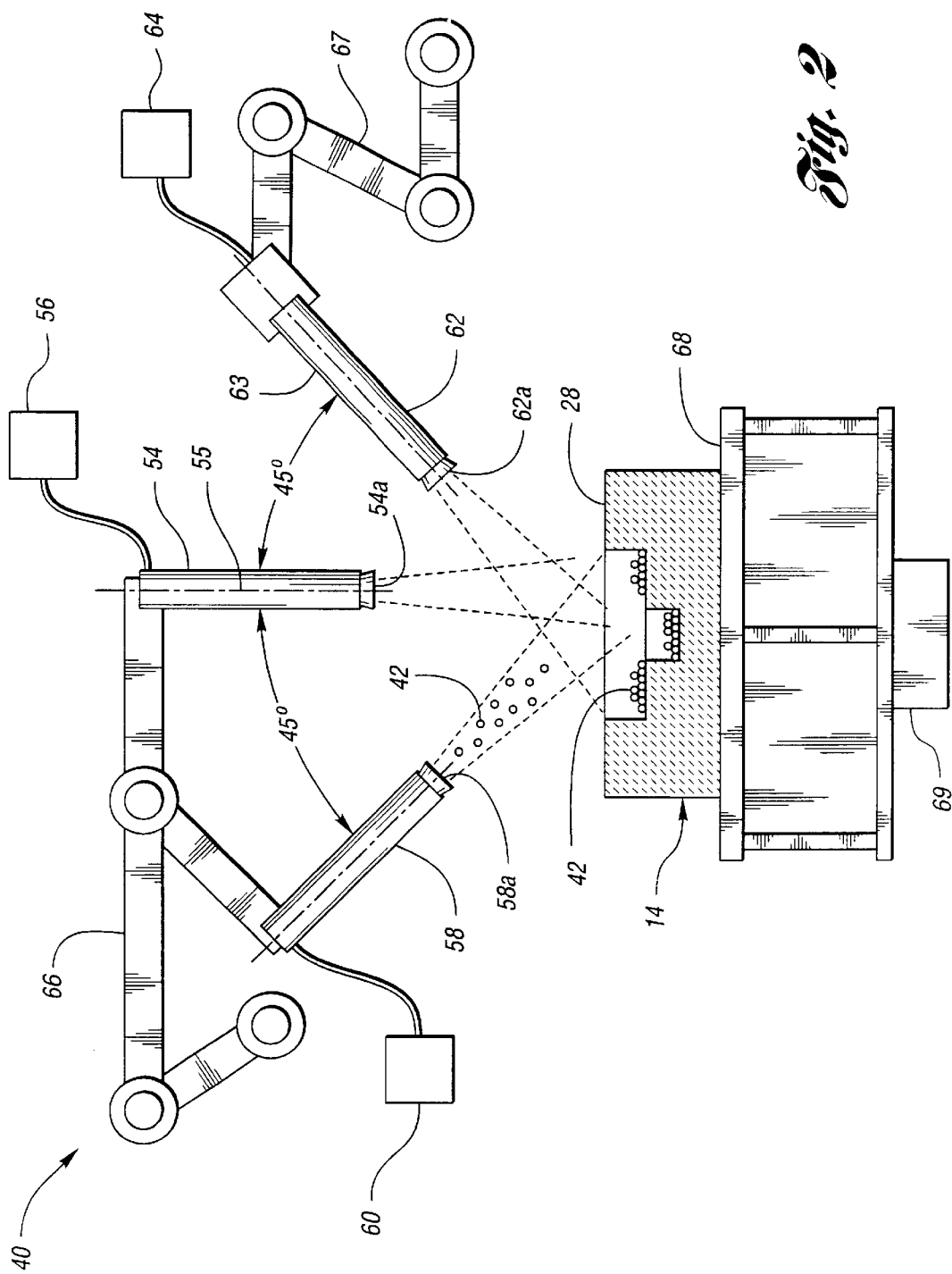

METHOD OF SPRAY FORMING READILY WELDABLE AND MACHINABLE METAL DEPOSITS

TECHNICAL FIELD

The present invention relates to the making of tools, and more particularly to a method of spray forming readily weldable metal deposits of low carbon steel.

BACKGROUND ART

Spray forming has become an accepted technique for producing steel prototype tooling (such as dies or molds) in a fraction of the time needed to make steel tooling conventionally. Spray forming techniques typically involve the following steps: (i) casting and solidifying a ceramic spraying pattern about a plastic master pattern of the tool to be produced; (ii) thermally spraying metallic particles onto a ceramic pattern; (iii) allowing the sprayed metallic particles to cool thereby forming a metal deposit having the general shape of the master pattern; and (iv) separating the metal deposit from the ceramic pattern.

The metallic particles being thermally sprayed onto the ceramic pattern typically consist of steel having a carbon content of about 0.8% by weight. The use of steel having a carbon content of about 0.8% by weight results in metal deposits which have good surface and structural characteristics. However, the deposits formed of carbon steel have a carbon content of about 0.4% to 0.8% by weight do not lend themselves to be easily weldable or machinable. Thus, when a tool (i.e., a die or mold) formed of a metal deposit made using steel having a carbon content of about 0.8% by weight cracks, or needs modifying to accommodate a design change, the tool is no longer useful and a brand new tool must be prepared since the tool is not easily weldable or machinable.

Accordingly, it would be desirable to provide a method of making a spray forming metal deposit which is readily weldable and machinable.

Accordingly, it is an object of the present invention to provide a readily weldable and machinable metal deposit and a method of making the same.

DISCLOSURE OF INVENTION

The invention meets the above object and others by providing a method of spray forming a readily weldable and machinable metal deposit. The method comprises (a) providing a ceramic spray forming pattern; (b) heating the spray forming pattern to a sustained temperature sufficient to inhibit internal stress formation in carbon steel having a carbon content of less than about 0.3 weight percent deposited on the heated spray forming pattern; (c) spraying metallic particles onto the spray forming pattern while the spray forming pattern is heated to the sustained temperature, the metallic particles having a carbon content which is sufficient to result in metal particles having a carbon content of less than about 0.3 weight percent when deposited on the heated spray forming pattern; and (d) allowing the sprayed metallic particles to cool to form a metal deposit having a carbon content of less than about 0.3 weight percent.

BRIEF DESCRIPTION OF DRAWINGS

FIG. 2 is a schematic illustration of an apparatus used in one of the processing steps of FIG. 1.

BEST MODE FOR CARRYING OUT THE INVENTION

Figure 1:
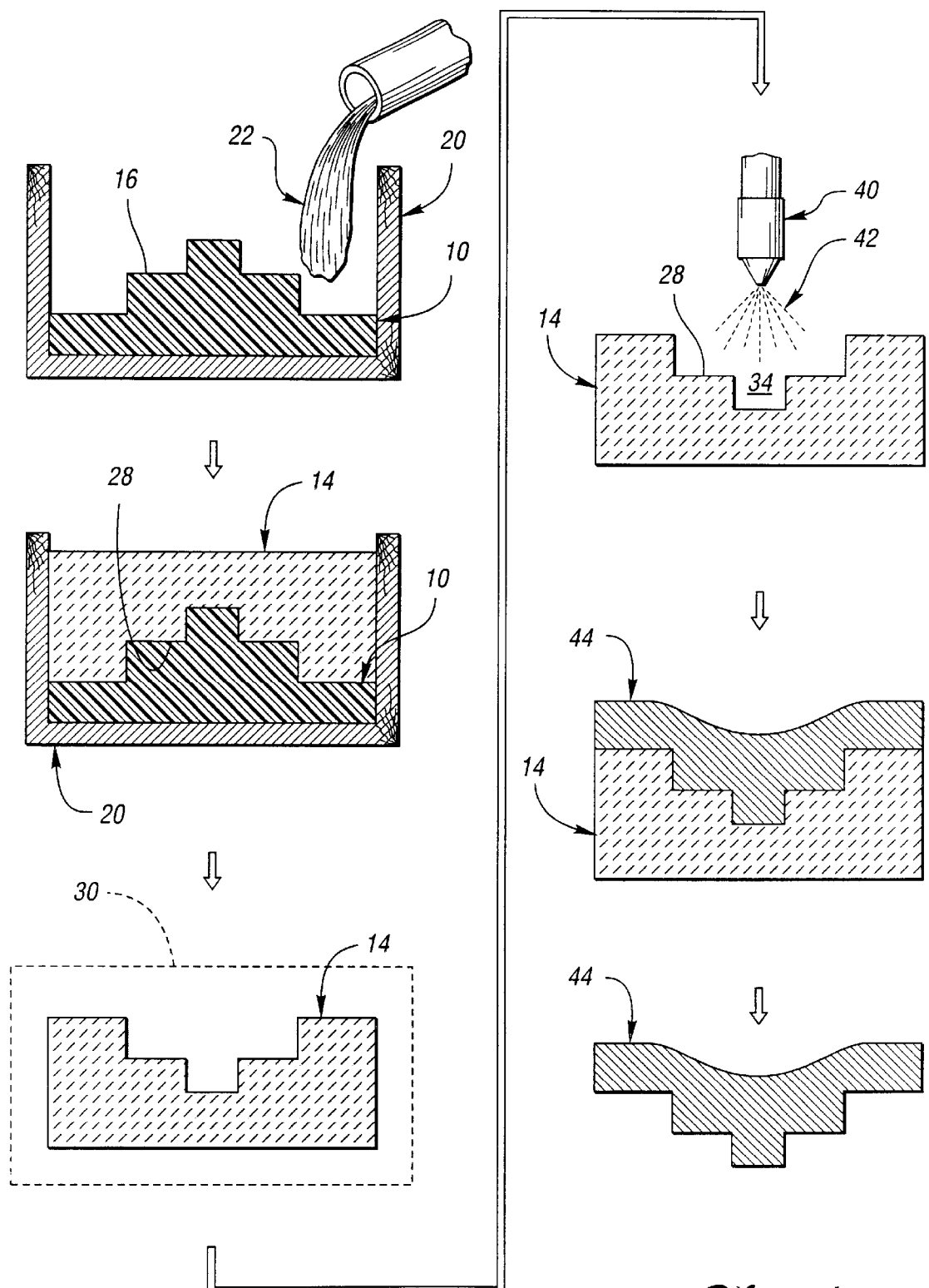
FIG. 1 is a schematic flow diagram of the processing steps of the present invention.

The present invention relates to a process of forming readily weldable and machinable metal deposits. The process of this invention comprises at least four basic steps: (a) providing a ceramic spray forming pattern; (b) heating the spray forming pattern to a sustained temperature sufficient to inhibit the formation of internal stress in carbon steel having a carbon content of less than about 0.3 weight percent when deposited on the heated spray forming pattern; (c) spraying metallic particles onto the spray forming pattern when the spray forming pattern is heated to the sustained temperature, the metallic particles having a carbon content which is sufficient to result in metal particles having a carbon content of less than about 0.3 weight percent when deposited on the heated spray forming pattern; and (d) allowing the sprayed metallic particles to cool to form a metal deposit having a carbon content of less than about 0.3 weight percent.

The resulting deposit must have (i) a carbon content of less than about 0.3 weight percent to be relatively easily weldable, and (ii) a Rockwell C hardness of less than about 35 to be easily machinable. Thus, the sprayed metallic particles must originate from a sprayable steel material, such as steel wire electrodes, having a carbon content which, when deposited on the spray forming pattern, is less than about 0.3 weight percent. Typically, deposited carbon steel having a carbon content of less than about 0.3 weight percent will warp and crack under the influence of internal stresses in the deposited carbon steel. It has been discovered by the applicants of the present invention that deposited steel having a carbon content of less than about 0.3 weight percent tends not to warp or crack when the pattern in receipt of the deposited steel is heated to a sufficiently high temperature to inhibit the formation of internal stress, as will be explained below in greater detail.

As shown in FIG. 1, step (a) of the present invention involves casting and solidifying a low thermally conductive material, such as ceramic about a master pattern 10 to form a ceramic spray forming pattern 14. The master pattern 10, shown schematically, has an upper surface 16 having a desired shape or contour. The master pattern 10 is preferably polymeric and may be created using solid-free form fabrication techniques controlled by a CAD/CAM model.

Free-formed fabrication can comprise stereolithography, cubital, laminated or foam object manufacturing, 3-D printing and stratified extrusion. Stereolithography is preferred because it creates a plastic pattern directly from a vat of liquid photo curable polymer through selective solidification using a scanner laser beam. The master pattern 10 could also be milled, or otherwise formed, out of wood, metal, laminate materials, renboard, etc.

A preferred method for casting the ceramic spray forming pattern 14 comprises placing the master pattern 10 in an open box 20. A liquefied ceramic slurry 22 is then poured into the box 20 about the master pattern 10. The ceramic slurry 22, after it solidifies, forms the spray forming pattern 14 which has a periphery, or outer surface 28, which closely resembles the inverse of the outer surface 16 of the master pattern 10, such that the spray forming pattern 14 forms a negative of the master pattern 10. The spray forming pattern 14 is then removed from the box 20. In the casting step up above, a release agent, such as silicone or a wax is preferably applied to the upper surface 16 of the master pattern 10 and the box 20 to help facilitate the removal of the spray forming pattern 14 from the box 20 and the master pattern 10.

The ceramic slurry 22 which can be used to form the spray forming pattern 14 can be made of any suitable ceramic known in the art. Examples of suitable ceramics include, but are not limited to Cotronics Rescor 780™, containing aluminum oxide, or silica core sand. The 780™ ceramic provides: (i) an excellent surface finish, (ii) good thermal shock resistance at 1800–2400° F., (iii) a compressive strength of at least about 9000 psi, and (iv) low shrinkage along with low thermal expansion.

After the separated, non-fired ceramic spray forming pattern 14 is removed from the box 20, it is then heated in oven 30 to (i) drive off any remaining liquid in the ceramic, (ii) further densify the ceramic, and (iii) achieve a temperature for the ceramic spray forming pattern which will inhibit internal stress formation of carbon steel having a carbon content of less than about 0.3 weight percent when sprayed on the heated ceramic spray forming pattern. The temperature at which the spray forming pattern 14 must be above to inhibit the formation of internal stresses in steel having a carbon content of less than about 0.3 weight percent when deposited on the heated spray forming pattern 14 is believed to be based upon the amount of cold work the semi-solid sprayed metal particles will receive as a result of impact with the ceramic spray forming pattern 14. It has been discovered by the applicants of the present invention that when carbon steel having a carbon content of less than about 0.3 weight percent is sprayed upon a ceramic spray forming pattern having a sustained temperature above about 500° C., preferably in the range of about 600–800° C. and most preferably about 700° C., the formation of internal stresses in the deposited carbon steel will be inhibited, resulting in a metal deposit having acceptable surface and structural characteristics.

The heating of the spray forming pattern 14 in the oven 30 may preferably be staged, such as by use of a preheat stage at about 100–110° C. for at least two hours to drive off any remaining liquid in the ceramic, then gradually ramping up the heating to a temperature of about 300° C. for about one hour, holding the temperature at about 300° C. for another two hours, then gradually ramping the temperature up to about 700° C. for five hours to achieve a higher densification in the ceramic. The ceramic spray forming pattern 14 is then removed from the heating oven 30 for use as a metal spray forming receptor. The outer surface 28 defines cavity 34 having the general shape of the master pattern 10 such that the spray forming pattern 14 is a negative of master pattern 10.

Thermal spray guns 40, shown schematically in FIG. 1, are preferably utilized to spray metallic particles 42 onto the spray forming pattern 14 and, in particular into the cavity 34. The thermal spray guns 40 may be of the oxy-acetylene flame type in which a wire or powder metal is fed thereinto, a plasma into which powder metal is fed, or preferably one or two wire arc type, in which the tip of the wires is fed into the arc. Cold spraying guns could be used in place of thermal spray guns to spray metallic particles onto the spray forming pattern 14.

In a two wire arc spray gun, an electric arc is generated in a zone between two consumable wire electrodes; as the electrodes melt, the arc is maintained by continuously feeding the electrodes into the arc zone. The metal at the electrode tips is atomized by a blast of generally cold compressed gas. The atomized metal is then propelled by the gas jet to a substrate forming a deposit thereon.

In a single wire arc apparatus, a single wire is fed either through the central axis of the torch or is fed at an acute angle into a plasma stream that is generated internally within the torch. The single wire acts as a consumable electrode that is fed into the arc chamber. The arc is established between the cathode of the plasma torch and the single wire as an anode, thereby melting the tip of the wire. Gas is fed into the arc chamber, coaxially to the cathode, where it is expanded by the electric arc to cause a highly heated gas stream (carrying metal droplets from the electrode tip) to flow through the nozzle. A further higher temperature gas flow may be used to shroud or surround the spray of molten metal so that droplets are subjected to further atomization and acceleration.

Yet still other wire arc torch guns may be utilized that use a transferred-arc plasma whereby an initial arc is struck between a cathode and a nozzle surrounding the cathode; the plasma created from such arc is transferred to a secondary anode (outside the gun nozzle) in the form of a single or double wire feedstock causing melting of the tip of such wire feedstock.

In a preferred embodiment as shown in FIG. 2, three guns are utilized to lay down the metal particles 42 on the spray forming pattern 14. A first thermal spray gun 54 has a gun tip 54a which is oriented along an axis 55 perpendicular to the general planar extent of the upper surface 28 of the spray forming pattern 14. The first thermal spray gun 54 has a power supply 56 operated at about 30 volts. A second gun 58 is carried so that its gun tip 58a is oriented at an angle of about 45° from the first gun axis 55 and has a power supply 60 operated at about 30 volts. The third spray gun 62 has a gun tip 62a oriented so that its axis 63 is also at a 45° angle with respect to the axis 55 of the first gun and lies in a plane that is generally perpendicular to the plane encompassing guns 54 and 58. The third gun 62 has a power supply 64 operated continuously at about 30 volts.

Each of the guns 54, 58 and 62 is supplied with a high pressure gas from their respective supplies consisting of nitrogen, air, or a mixture thereof, at a pressure of about 40 to 120 psi.; such gas being utilized to affect the atomization of the wire droplets.

The guns 54, 58 and 62 may be moved robotically, such as by robots 66 and 67, and the spray forming pattern 14 may be mounted on a turntable 68 and rotated by a motor 69 to achieve relative movement between the spray pattern of the guns and the surface 28; repeated passes of the spray material will deposit a bulk deposit 44 (FIG. 1) having a thickness of at least about 0.5 inches, and preferably between about 1.5–2 inches on the surface 28. The thermal spraying step preferably lasts for about three hours, and results in deposits 44 having a thickness of between about 1.5 to about 2.0 inches for deposits of about 2 feet by 2 feet. Larger sized-deposits may require thicker sections and more passes.

The spraying material utilized for each of the guns 54, 58 and 62 is carbon steel having a chemistry that consists of steel having a carbon content in the range of about 0.01–0.6% by weight provided that the carbon content of the steel deposited on the spray forming pattern 14 is less than about 0.3% by weight. Preferably the carbon steel to be sprayed has a carbon content of less than about 0.3 weight percent, and most preferably about 0.1 weight percent. The carbon content of the deposited steel can be measured by Leco Testing according to ASTM No. E-1019. It is necessary that the carbon content of the steel deposited on the spray forming pattern 14 be less than about 0.3% by weight so that the resulting deposit 44 is easily weldable. Also, the Rockwell C hardness of the resulting metal deposit 44 is preferably less than about 35 so that the deposit can be easily machined. Preferably, the Rockwell C hardness is less than about 30.

The deposited metal, by way of the heat received from the heated ceramic spray forming pattern 14, remains at a temperature which is sufficient to inhibit the formation of internal stresses in carbon steel having a carbon content of less than about 0.3 weight percent when deposited thereover. The temperature of the spray forming pattern 14 may be maintained at the desired temperature by additionally heating the pattern separate from the oven 30 so that the temperature may be sustained for one to two hours, if necessary during the spray forming step. The temperature may also be controlled by changing spray parameters such as current, voltage, spray distance, spray gas and spray pressure. Preferably, the tips 54a, 58a, and 62a of the guns 54, 58 and 62 are arranged about 7–14 inches, and preferably about 8–10 inches, from the surface 28 of the pattern 14 with the guns having a current spray in the range of about 100–250 amps, and preferably about 150–200 amperes.

After the spraying step, the deposited bulk material 44 and the spray forming pattern 14 are allowed to air cool to room temperature, preferably over a period of about two hours (i.e., 100° C./hour). The deposit 44 is separated from the ceramic spray forming pattern 14 by cutting with a water jet cutting device which removes essentially all of the deposit outside the cavity 34 allowing the interface of the deposit and spray forming pattern. The deposit 44 in the cavity 34 is then separated by chiseling away the ceramic which is relatively fragile. To insure that all of the ceramic is removed, the deposit 44 may then be bead blasted. The resulting separated deposit 44 is an exact negative of the pattern 14, or an exact replica of the master 10 and then can be used as a die or mold part accordingly.

It is believed that the problem with using low carbon steel (i.e., steel containing less than 0.3 weight percent carbon), is that there is change to offset shrinkage upon cooling when the ceramic spray forming pattern 14 is not heated to at least about 500° C. when receiving the steel particles. Thus, what has been found is that low carbon steel will crack due to internal stresses from shrinkage when being deposited on patterns having a temperature below about 500° C. until sufficient build-up has occurred to accommodate subsequent internal stresses. Applicants have discovered that by heating the pattern, or elevating the pattern temperature, to at least about 500° C., a severe quench that causes an immediate contraction of the metal, which may lead to warping or cracking when the particles hit the spray forming pattern, may be prevented. It has also been determined that the forming deposit 44 must be kept at an elevated temperature greater than about 300° C. for a substantial portion of the spraying step for appreciable or noticeable cracking or warping not to occur.

The following non-limiting example illustrates the present invention.

EXAMPLE

A ceramic spray pattern was thermally sprayed with a 0.1% carbon steel wire. The ceramic spray pattern was heated to a temperature of about 700° C. prior to initiation of the thermal spraying. The surface temperature of the ceramic spraying pattern was maintained at about at least 360° C. Thermal spraying was stopped after about 200 passes, which gave a part thickness of about 0.5 inches. No peeling or warpage of the resulting part was noticed. The Rockwell C hardness of the resulting part was measured to be about 32.

Comparative Example

A ceramic spray pattern was thermally sprayed with a 0.1% carbon steel wire. The ceramic spray pattern was heated to a temperature of about 300° C. prior to initiation of the thermal spraying. Severe warpage occurred after only 7 passes, which gave a part thickness of about 0.04 inches.

While the best modes for carrying out the invention have been described in detail, those familiar with the art to which this invention relates will recognize various alternative designs and embodiments for practicing the invention as defined by the following claims.

What is claimed is:

1. A method of spray forming a readily weldable steel prototype tool having a Rockwell C hardness less than about 35, said method comprising:

(a) providing a ceramic spray forming pattern having a compressive strength of at least about 9,000 psi;

(b) heating the spray forming pattern to a sustained temperature sufficient to prevent internal stress formation in carbon steel having a carbon content of between about 0.01 less than 0.3 weight percent when deposited on the heated spray forming pattern;

(c) spraying molten metallic particles, originating from a sprayable steel material in which the carbon content, when deposited on the spray forming pattern, is between about 0.01 less than 0.3 weight percent, onto the spray forming pattern heated to the sustained temperature;

(d) maintaining the sprayed metallic particles on the spray forming pattern above about 300° C. during the spraying in step (c);

(e) allowing the sprayed metallic particles to air cool to room temperature to form the steel prototype tool having a thickness of at least about 0.5 inches and having a carbon content of between about 0.01 less than 0.3 weight percent on the spray forming pattern; and (f) separating the steel prototype tool from the spray forming pattern; wherein the sustained temperature is above about 600° C.

2. The method of claim 1 wherein the sustained temperature is above about 700° C.

3. The method of claim 1 wherein at least one thermal spray gun is provided for spraying the metallic particles onto the heated spraying pattern.

4. The method of claim 3 wherein each of the thermal spray guns include a gun tip which is oriented about 7–14 inches from the spray forming pattern, each of the guns having a current spray in the range of about 100–250 amperes.

5. The method of claim 4 wherein each of the thermal spray guns include a gun tip which is oriented about 8–10 inches from the spray forming pattern, each of the guns having a current spray in the range of about 150–200 amperes.

6. The method of claim 1 wherein the metal deposit has a thickness of between about 1.5–2 inches.

7. The method of claim 1 wherein the metal deposit is cut from the spray forming pattern using a water jet cutting device.

8. The method of claim 1 wherein the spraying is performed by at least one wire arc spray gun.

9. The method of claim 1 wherein the metal deposit has a thickness which is sufficient to be used in a molding tool without requiring any reinforcing backing material.

\* \* \* \* \*